US008146830B2

(12) United States Patent
Johnson et al.

(10) Patent No.: US 8,146,830 B2
(45) Date of Patent: Apr. 3, 2012

(54) RFID TAG AND METHOD OF FABRICATING AN RFID TAG

(75) Inventors: Mark Johnson, Veldhoven (NL); Franciscus Widdershoven, Eindhoven (NL); Adrianus Sempel, Waalre (NL)

(73) Assignee: NXP B.V., Eindhoven (NL)

(*) Notice: Subject to any disclaimer, the term of this patent is extended or adjusted under 35 U.S.C. 154(b) by 682 days.

(21) Appl. No.: 11/909,107

(22) PCT Filed: Feb. 28, 2006

(86) PCT No.: PCT/IB2006/050616

§ 371 (c)(1), (2), (4) Date: Oct. 7, 2008

(87) PCT Pub. No.: WO2006/100614

PCT Pub. Date: Sep. 28, 2006

(65) Prior Publication Data

US 2009/0230196 A1 Sep. 17, 2009

(30) Foreign Application Priority Data

Mar. 21, 2005 (EP) .................................... 05102215

(51) Int. Cl.

*G06K 19/00* (2006.01)
*G06K 19/06* (2006.01)
*G08B 13/14* (2006.01)
*H01L 35/00* (2006.01)

(52) U.S. Cl. ..................... 235/492; 235/487; 340/572.1; 340/572.7; 343/700 R

(58) Field of Classification Search .................. 235/492; 340/572.1–572.8

See application file for complete search history.

(56) References Cited

U.S. PATENT DOCUMENTS 5,914,862 A * 6/1999 Ferguson et al. ............ 361/737
7,487,373 B2 * 2/2009 Koyama ....................... 713/323
2003/0033713 A1 * 2/2003 Hausladen ..................... 29/873
2003/0052177 A1 3/2003 Halope
2006/0011731 A1 * 1/2006 Anders et al. ................ 235/492

FOREIGN PATENT DOCUMENTS

EP 1365353 A2 11/2003
EP 1365353 A3 3/2004
JP 2002-290136 A 10/2002
JP 2002-342727 A 11/2002
JP 2005-063081 A 3/2005

OTHER PUBLICATIONS

5th Leti Annual Review http://www-leti.cea.fr/commun/ar-2003/T4-multimedia/20-meyer.pdf R. Meyer Downloaded on Nov. 15, 2004.

Minatec 2003 Platform for Large Area Electronics http://www.minatec.com/minatec2003/posters_pdf/deluca_a_ltcv.pdf Anthony De Luca Downloaded on Nov. 11, 2004.

* cited by examiner

*Primary Examiner* — Michael G Lee
*Assistant Examiner* — Laura Gudorf

(57) ABSTRACT

An RFID tag (1, 1') comprises at least one antenna (2, 2') and electronic tag components (4) cooperating with the antenna, wherein the antenna (2, 2') and the electronic tag components (4) are positioned on a common substrate (3), wherein portions (**3*b*) of the substrate encircled by the antenna (2, 2') and not occupied by the electronic tag components (4**) have been removed.

11 Claims, 2 Drawing Sheets

RFID TAG AND METHOD OF FABRICATING AN RFID TAG

FIELD OF THE INVENTION

The invention relates to an RFID tag comprising at least one antenna and electronic tag components cooperating with the antenna, wherein the antenna and the electronic tag components are positioned on a common substrate.

The invention further relates to a method of fabricating an RFID tag comprising providing a substrate, defining onto the substrate at least one antenna and electronic tag components that cooperate with the antenna.

BACKGROUND OF THE INVENTION

Whilst the business for RFID (Radio Frequency Identification) tags is starting to take off, manufacturing of these RFID tags is still a compromise. On the one hand, potentially lower cost technologies such as polymer TFTs (Thin Film Transistors) cannot always reach the frequency performance required for the RFID tags (either 13.5 MHz, or the 700-2500 MHz range). On the other hand, whilst the electronics components of the tag (in the order of a few hundred bits of memory and hundred transistors) can be cost effectively manufactured in CMOS, the overall costs of such CMOS based tags are nevertheless high due to the costs for manufacturing the antenna, interconnecting the antenna with the electronics components and packaging the same.

One option to produce RFID tags at a lower cost is to move to LTPS (Low Temperature Poly-Silicon) technology. As LTPS can handle the frequency requirements for RFID tags and is significantly less expensive than CMOS (around a factor of 10), it may be cost effective to integrate both the electronics and the antenna onto a single substrate. However, it turns out that an LTPS based tag system with an area, which is cost effective compared to the known solution, is not sufficiently sensitive for most practical applications. Specifically, a larger antenna would be required—but as this will requires a larger substrate the price of the tag (which in an integrated approach such as LTPS is a linear function of the device area) will increase unacceptably.

OBJECT AND SUMMARY OF THE INVENTION

It is an object of the invention to provide a low cost RFID tag with integrated antenna and a method of fabricating the same, in which the disadvantages explained above are avoided.

In order to achieve the object defined above, with an RFID tag according to the invention characteristic features are provided so that an RFID tag according to the invention can be characterized in the way defined below, that is:

An RFID tag comprising at least one antenna and electronic tag components cooperating with the antenna, wherein the antenna and the electronic tag components are positioned on a common substrate, wherein portions of the substrate encircled by the antenna and not occupied by the electronic tag components have been removed.

In order to achieve the object defined above, with a method of fabricating an RFID tag according to the invention characteristic features are provided so that a method according to the invention can be characterized in the way defined below, that is:

A method of fabricating an RFID tag comprising providing a substrate, defining onto the substrate at least one antenna and electronic tag components that cooperate with the antenna, and removing portions of the substrate that are encircled by the antenna and are not occupied by the electronic tag components so that the removed portions are still usable.

The characteristic features according to the invention provide the advantage that a low cost RFID tag with an integrated antenna is created by minimizing the non-active area of the substrate which RFID tag still provides a highly sensitive antenna by keeping the antenna area large.

The measures as claimed in claim 2 and claim 7, respectively, provide the advantage that the necessary area of the substrate is reduced to a minimum while full functionality is still maintained. Moreover, the antenna and the electronic tag components can be easily integrated in this way, providing additional advantages in interconnecting the same.

The measures as claimed in claim 3 and claim 8, respectively, provide the advantage that the tag sensitivity is increased due to the large effective area of the antenna whilst the unit costs remain low due to the low amount of substrate area.

The measures as claimed in claim 4 and claim 9, respectively, provide the advantage that with LTPS technology the frequency requirements of the RFID tags can be handled and the productions costs can be kept low.

The measures as claimed in claim 5 and claim 10, respectively, provide the advantage that for RFID tag applications with lower performance requirements the unit costs can be further reduced, whereas for high performance applications costs can also be kept low and transistor properties are still maintained.

The aspects defined above and further aspects of the invention are apparent from the exemplary embodiment to be described hereinafter and are explained with reference to this exemplary embodiment.

BRIEF DESCRIPTION OF THE DRAWINGS

The invention will be described in more detail hereinafter with reference to exemplary embodiments. However, the invention is not limited to these exemplary embodiments.

DESCRIPTION OF EMBODIMENTS

Figure 1:
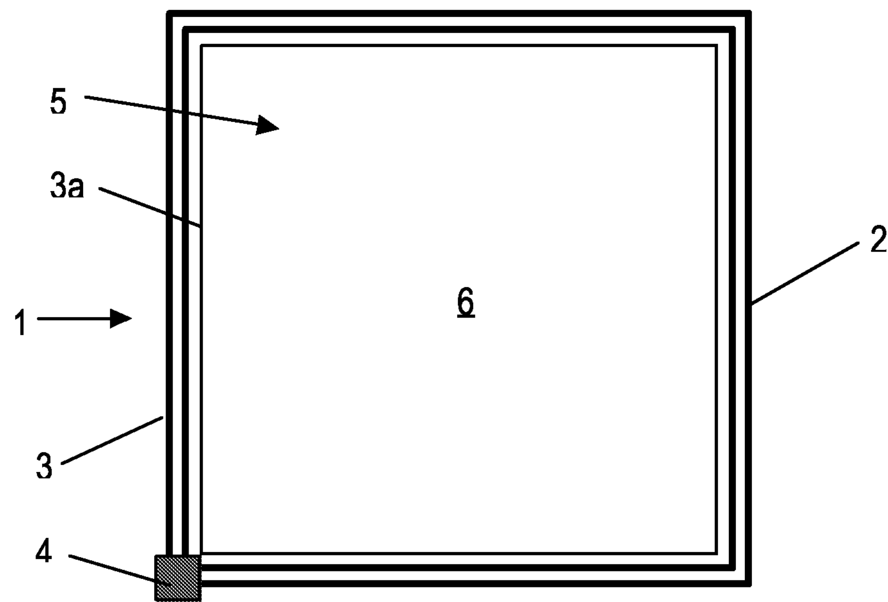
FIG. 1 shows a first embodiment of an RFID tag according to the invention in top view.

FIG. 1 shows an RFID tag 1 according to the invention. The RFID tag 1 comprises an antenna 2. The antenna 2 is configured as a simple square frame antenna. For the sake of clarity of the drawing the antenna 2 is only depicted with two windings, but it should be observed that the number of windings could be considerably higher, depending on the necessary sensitivity of the antenna. The RFID tag 1 further comprises electronic tag components 4. Both the antenna 2 and the electronic tag components 4 are positioned on a common substrate 3, wherein some of the electronic tag components 4 are interconnected with the antenna 2. In the present example the electronic tag components 4 are positioned at the lower left corner of the frame antenna 2. The substrate 3 is for example a glass substrate with LTPS electronics, which allows for integrating the antenna 2 and the electronic tag components 4 on the same substrate 3. LTPS provides the further advantages that it can handle the frequency requirements for RFID tags (e.g. either 13.5 MHz, or the 700-2500 MHz range) and that it is significantly less expensive compared with CMOS.

The antenna 2 encircles a square area 5, which is the effective area where electromagnetic waves are received by the antenna 2. The size of the area 5 is proportional to the sensitivity of the antenna 2. Hence, in terms of sensitivity considerations the area 5 should be as large as possible. However, the need for a large area 5 defined by the antenna 2 contrasts to the need for low material costs. The price of an LTPS substrate is a linear function of the substrate area; therefore under manufacturing considerations the substrates of RFID tags should be as small as possible. In order to break through said dilemma the invention proposes to create LTPS based RFID tags with integrated antennas 2, where the effective size of the area 5 encircled by the antenna 2 is large compared with the actual area of the substrate 3. In order to achieve this goal an inner portion of the substrate 3 defined by the circumference line 3*a* has been physically removed, leaving a free space 6 in the center of the RFID tag 1. The free space 6 substantially coincides with the effective area 5 encircled by the antenna 2. The effective area 5 is merely required to pick up and transmit electromagnetic signals with sufficient power and sensitivity, so it makes no difference whether within this area 5 there are portions of the substrate 3 or said free space 6. Indeed, it may even be preferred to have free space, as this will avoid any attenuation of the electromagnetic signal. It is essential to note that the portion of the substrate 3 that has been removed was neither occupied by parts of the antenna 2 nor by the electronic tag components 4 and has been removed in such a manner that said portion can be used for other electronic applications. In other words, said portion of the substrate 3 has been removed in a non-destroying manner, e.g. by laser cutting. It should further be observed that the size of the free space 6 exceeds the actual area of the substrate 3, which is used in the RFID tag 1 for the antenna 2 and the electronic tag components 4. In this manner, the sensitivity of the RFID tag 1 is increased whilst the material price remains low. Further, since the region of the substrate 3 where the electronic tag components 4 are positioned coincides with a part of the region of the substrate 3 where the antenna 2 is positioned the actual area of the substrate 3 is further reduced.

Figure 2:
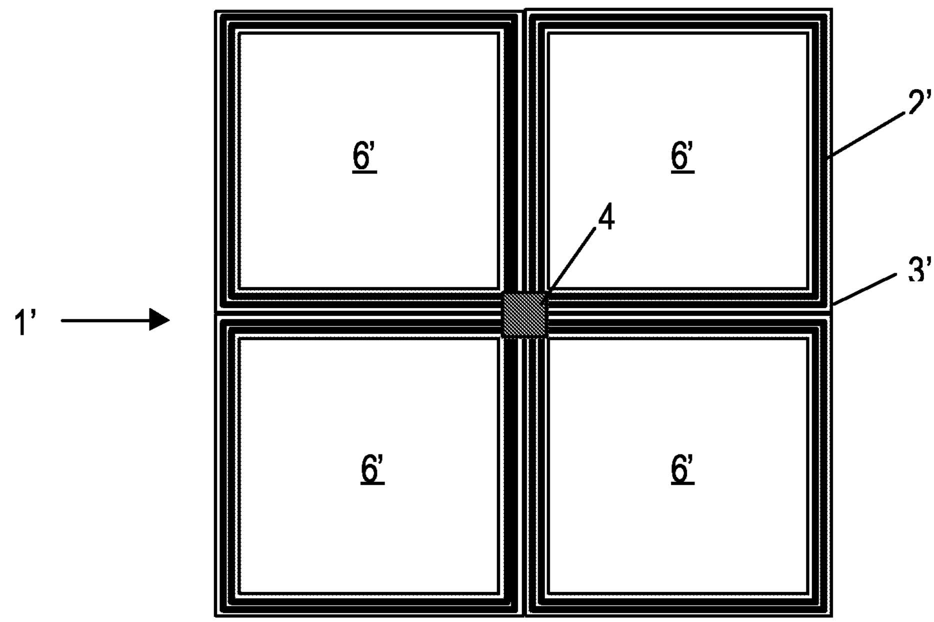
FIG. 2 shows a second embodiment of an RFID tag according to the invention in top view.

FIG. 2 shows a second embodiment of an RFID tag 1' according to the invention in top view. This RFID tag 1' comprises a more complicated multi-pole antenna 2' in a four windows multi frame configuration. The electronic tag components 4 are positioned in the center of the tag. Also in this embodiment of the inventive RFID tag 1' all of the substrate portions inside the four frame windows of the antenna 2' have been removed for further use, so that within the antenna windows free spaces 6' have been left. In this way a sensitive RFID tag 1' has been realized that consumes only a small amount of LTPS substrate 3'. Removal of the portions of the substrate 3' can again be realized by e.g. laser cutting or other known manufacturing methods.

Figure 3:
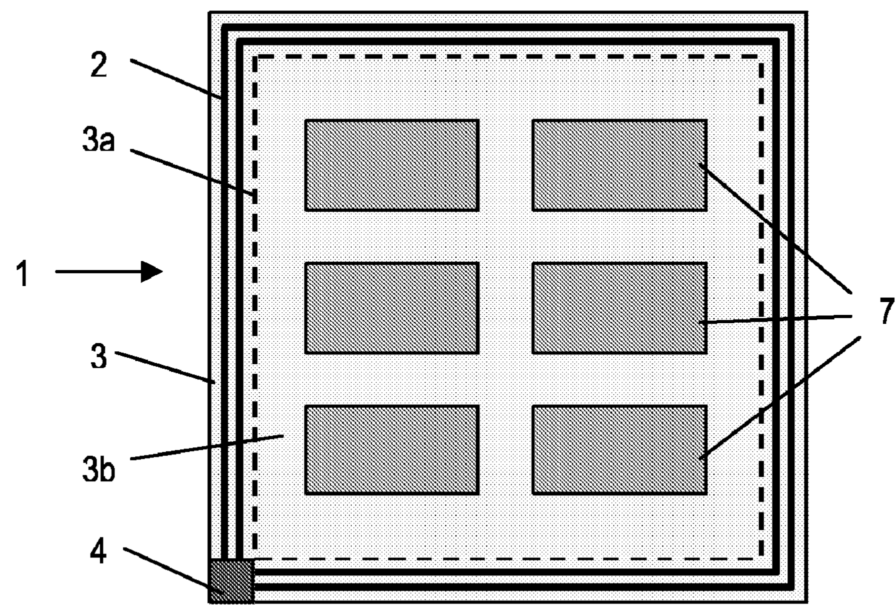
FIG. 3 shows in top view the first embodiment of the RFID tag together with other electronic products during the fabricating process.

The process for fabricating the RFID tag 1 according to the invention is now being explained with reference to FIG. 3. First, an LTPS substrate 3 is provided which—in this example—has a square configuration. Onto this substrate 3 the frame antenna 2 is provided near the perimeter of the substrate 3. Next, the electronic tag components 4 are defined onto the substrate 3 in integrated manner with the antenna 2. The antenna 2 encircles an inner portion 3*b* of the substrate 3. Onto this inner portion 3*b* other electronic products 7 are formed. Finally, the inner portion 3*b* of the substrate 3 together with the electronic products 7 is removed, for instance by laser cutting along the circumference line 3*a*. The remaining RFID tag 1 only uses a small amount of LTPS substrate 3.

Figure 4:
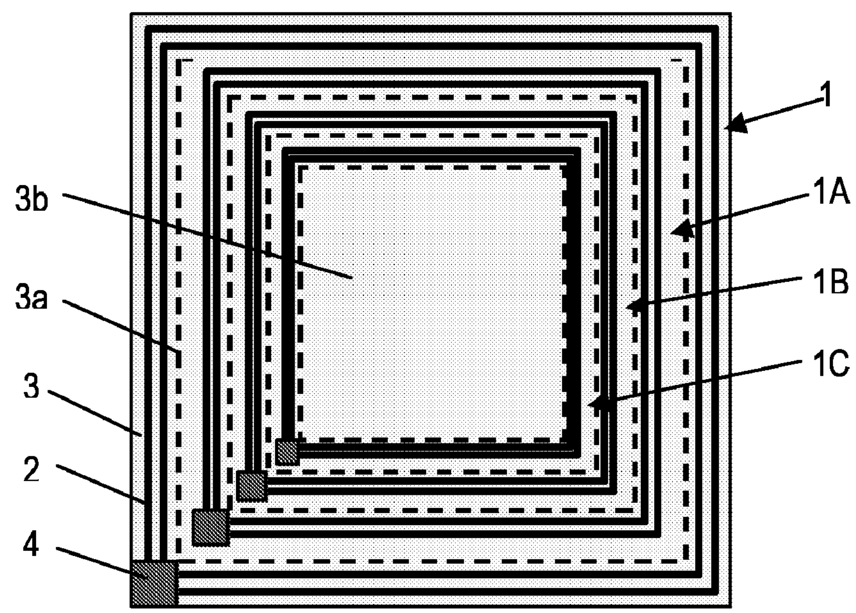
FIG. 4 shows in top view the first embodiment of the RFID tag together with further RFID tags during the fabricating process.

FIG. 4 shows an alternative use of the portion 3*b* of the substrate 3 to be removed from the RFID tag 1. In this embodiment, of a multiplicity of tags 1A, 1B, 1C having decreasing sizes, tags 1A, 1B, 1C are positioned one within the other on the substrate portion 3*b*. Apart from the different sizes the RFID tags 1, 1A, 1B, 1C have the same properties, each comprising an antenna 2 and electronic tag components 4 defined onto the substrate 3. It should be observed that the central part of substrate portion 3*b* that is empty in the drawing could be used for defining additional RFID tags or other electronic products in order to make maximum use of the overall area of the substrate 3.

Whilst the above embodiments of integrated tags have been described in terms of LTPS technology, in some (lower performance) applications it may be possible to replace LTPS substrates for RFID tags with integrated antenna by active matrix technologies, such as a-Si or polymer based electronics technologies, but also CdSe based active devices and hydrogenated a-Si nitride based technologies such as diodes or MIM devices. Furthermore, in high performance applications the integrated tag electronics and antenna can also be applied to the substrate by transferring techniques from a carrier substrate, as for instance used with silicon-on-insulator/silicon-on-anything for a CMOS based process, or for LTPS as is known from Seiko-Epson under the trade name “Suftla”. Again, we here can re-use the obsolete areas of the carrier substrate from where the integrated electronics and antenna is transferred, in order to achieve the lowest production price while maintaining the best transistor properties.

The invention claimed is:

1. An RFID tag comprising at least one antenna and electronic tag components cooperating with the antenna, wherein the antenna and the electronic tag components are positioned on a common substrate, wherein a portion of the substrate encircled by the antenna and not occupied by the electronic tag components has been removed, wherein onto the portion of the substrate to be removed at least one other RFID tag is defined.

2. An RFID tag as claimed in claim 1, wherein regions of the substrate within which the electronic tag components are positioned coincide at least partly with regions of the substrate within which the antenna is positioned.

3. An RFID tag as claimed in claim 1, wherein an effective area encircled by the antenna exceeds an actual area of the substrate used in the RFID tag.

4. An RFID tag as claimed in claim 1, wherein the electronic tag components comprise LTPS (Low Temperature Poly-Silicon) based electronic components.

5. An RFID tag as claimed in claim 1, wherein the electronic tag components are selected from at least one of amorphous silicon based electronic components, hydrogenated a-Si nitride based electronic components, CdSe based electronic components, polymer based electronic components, or silicon-on-insulator/silicon-on-anything for CMOS based electronic components.

6. A method of fabricating an RFID tag comprising providing a substrate, defining onto the substrate at least one antenna and electronic tag components that cooperate with the antenna, and removing a portion of the substrate that is encircled by the antenna and not occupied by the electronic tag components so that the removed portion is still usable and wherein onto the portion of the substrate to be removed at least one other electronic product is defined.

7. A method of fabricating an RFID tag as claimed in claim 6, wherein the antenna is configured as a frame antenna in a single or multi windowed configuration and wherein the electronic tag components are positioned within regions of the substrate that coincide at least partly with regions of the substrate within which the antenna is positioned.

8. A method of fabricating an RFID tag as claimed in claim 6, wherein an area of the portion of the substrate being removed exceeds an actual area of the substrate used in the RFID tag.

9. A method of fabricating an RFID tag as claimed in claim 6, wherein electronic tag components comprise LTPS (Low Temperature Poly-Silicon) based electronic components.

10. A method of fabricating an RFID tag as claimed in claim 6, wherein the electronic tag components are selected from at least one of amorphous silicon based electronic components, hydrogenated a-Si nitride based electronic components, CdSe based electronic components, polymer based electronic components, or silicon-on-insulator/silicon-on-anything for CMOS based electronic components.

11. A method of fabricating an RFID tag as claimed in claim 6, wherein, of a multiplicity of tags having decreasing sizes, the tags are positioned one within the other on the substrate.

* * * * *